United States Patent [19]

Zirphile

[11] 3,835,452

[45] Sept. 10, 1974

[54] CODING SYSTEM FOR STOCHASTIC REPRESENTATION

[75] Inventor: Jean Zirphile, Grenoble, France

[73] Assignee: Societe Generale de Constructions Electriques et Mecaniques (Alsthom), Paris, France

[22] Filed: Feb. 21, 1973

[21] Appl. No.: 334,403

[30] Foreign Application Priority Data

Feb. 21, 1972 France ..........................7205826

[52] U.S. Cl. ....................... 340/146.2, 340/347 DD

[51] Int. Cl. ............................................ G06f 7/02

[58] Field of Search ............. 340/347, 146.1, 146.2; 307/216; 328/159

[56] References Cited

UNITED STATES PATENTS

| | | | |
|---|---|---|---|
| 3,217,293 | 11/1965 | Metz | 340/146.2 |
| 3,349,195 | 10/1967 | Gray | 340/347 |
| 3,370,289 | 2/1968 | Hedgcock et al. | 340/347 |
| 3,371,334 | 2/1968 | Asher et al. | 340/347 |
| 3,422,423 | 1/1969 | Kaszynski et al. | 340/347 |
| 3,488,653 | 1/1970 | Rasche | 340/347 |
| 3,576,575 | 4/1971 | Hellwarth et al. | 340/347 |

*Primary Examiner*—Charles E. Atkinson
*Assistant Examiner*—Vincent J. Sunderdick
*Attorney, Agent, or Firm*—Craig & Antonelli

[57] ABSTRACT

The invention concerns the coding of a data item given in digital form, in a bifilar stochastic representation. It is characterized in that a comparator receives the bits of a digital noise and the data bits, other than the sign bit, of a digital data item to be coded, and supplies an output signal transmitted to one of the wires of a bifilar stochastic representation, possibly by means of elements in a simple combination of that signal and of the sign bit of the digital data item to be coded. The invention applies more particularly to operator elements in stochastic representation.

4 Claims, 2 Drawing Figures

CODING SYSTEM FOR STOCHASTIC REPRESENTATION

The invention concerns the coding of a data item given in digital form in a stochastic representation.

It is known that this coding may be effected by means of a comparator, which may be either a logic comparator or a half-adder, receiving the bits of a digital noise generator and the bits of the digital data item to be coded and supplying an output signal which gives the stochastic representation required. Such a system has been disclosed in copending U.S. application Ser. No. 42,017, filed on June 1, 1970, in the name of J. J. Hirsch, and assigned to the same assignee as the present application, which copending application has been abandoned in Apr. 3, 1973.

Coding in a comparator is a coding by fault, and the error is less than one bit having the slightest weight used in the comparator. The invention intends to reduce that error by inserting, in the stage of the comparator whose weight is the slightest, an uncertain binary signal having approximately a probability of ½. The error is thus reduced, on an average, to ±½ of the bit whose weight is the slightest. It is possible, more particularly, to sample that uncertain signal having approximately a probability of ½ on any one of the stages of the digital noise generator.

The invention may, to particular advantage, be applied in nonlinear calculators comprising means for coding, in stochastic signals, at least a part of the data item processed in the calculator. Such nonlinear calculators may, more particularly, be used for the conversion of polar coordinates into Cartesian coordinates, or for the reverse conversion.

These non-linear calculators comprise comparators receiving the bits of a digital noise generator and the bits of a digital integrator. It has been found that in this case, it was preferable to sample the uncertain binary signal having a probability of ½, not on a stage of the digital noise generator, but on an output of the digital integrator.

Figure 1:
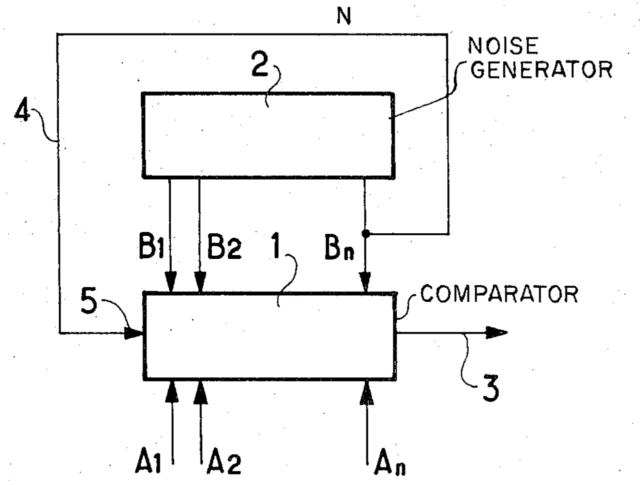
FIG. 1 is a schematic diagram of a system for coding of a digital data item in a stochastic representation.

In FIG. 1, a comparator constituted by a binary half-adder 1 receives a digital data item $A_1$ to $A_n$ to be coded and a noise signal $B_1$ to $B_n$ produced by a generator 2 and supplies at the output 3 the stochastic representation required.

According to the invention, the half-adder receives, by a connection 4, on the retaining input 5 of its stage whose weight is the slightest, an uncertain binary signal sampled, for example, on the bit $B_n$ whose weight is the greatest, sent by the generator 2 into the half-adder 1.

Figure 2:
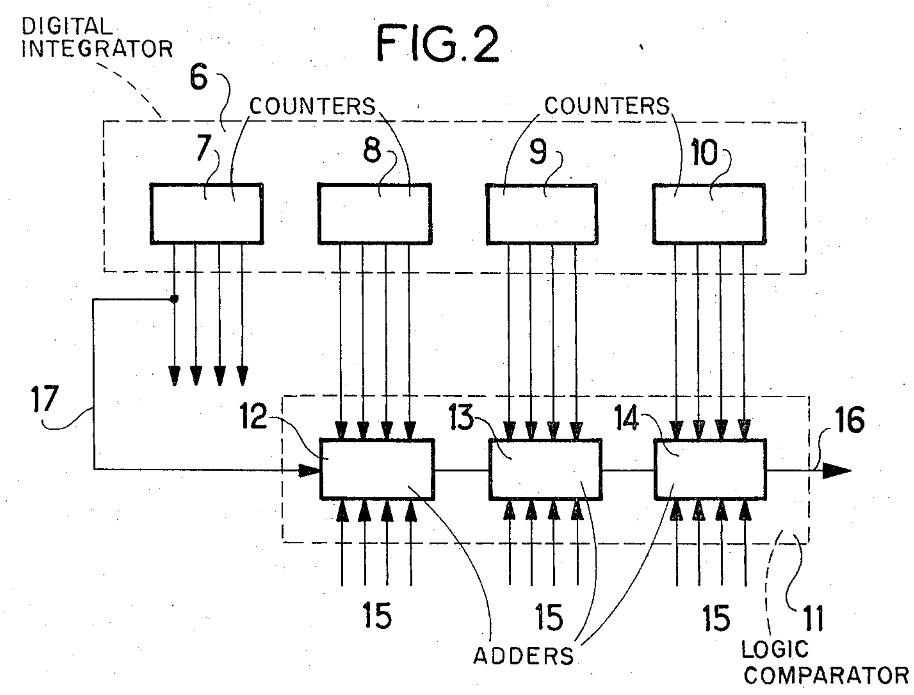
FIG. 2 is a schematic diagram of the circuit for coding of a digital data item supplied by a digital integrator in a stochastic representation.

In the example in FIG. 2, the data item to be coded is supplied by a digital integrator 6 constituted by a reversible BDC (binary decimal code) counter comprising four decades 7, 8, 9 and 10. A logic comparator 11 having three stages 12, 13 and 14 receives, on the one hand, the parallel output signals corresponding to the three decades whose weight is the highest among the four decades of the reversible BDC counter and, on the other hand, a noise signal 15, and supplies at an output 16 a signal in a stochastic form.

A connection 17 sends, to the retaining unit of the first stage 12 of the comparator 11, for example, the bit whose weight is the slightest of that decade of the integrator 6, which is not used in the comparator 11.

Tests carried out on a convertor converting polar coordinates into Cartesian coordinates comprising a coding circuit according to that in FIG. 2 have shown that the connection 17 reduced the conversion errors in a very great proportion.

Obviously, many modifications and variations of the present invention are possible in the light of the above teachings. It should therefore be understood that within the scope of the appended claims, the invention may be practiced otherwise than as specifically described.

What is claimed is:

1. System for coding a data item given in digital form in a stochastic representation, comprising a digital noise generator, a comparator receiving the output bits of said digital noise generator and the bits of the digital data item to be coded and supplying an output signal representing a selected stochastic representation, and means for applying a binary signal having approximately a probability of ½ to the stage of the comparator receiving the lowest order bits.

2. Coding system according to claim 1, characterized in that the said binary signal having approximately a probability of ½ is derived from one of the stages of said digital noise generator.

3. Coding system according to claim 1 wherein the digital data item to be coded is supplied by a digital integrator, said binary signal having approximately a probability of ½ being sampled on one of the outputs of the digital integrator.

4. Coding system according to claim 1, wherein said comparator is provided in the form of a binary half-adder.

* * * * *